United States Patent
Fagard

(10) Patent No.: US 7,876,308 B2
(45) Date of Patent: Jan. 25, 2011

(54) DISPLAY DEVICE DEDICATED TO PROXIMITY DETECTION

(75) Inventor: Pierre Fagard, Elancourt (FR)

(73) Assignee: Thales (FR)

( * ) Notice: Subject to any disclaimer, the term of this patent is extended or adjusted under 35 U.S.C. 154(b) by 590 days.

(21) Appl. No.: 10/535,673

(22) PCT Filed: Nov. 27, 2003

(86) PCT No.: PCT/EP03/50903

§ 371 (c)(1),
(2), (4) Date: May 12, 2006

(87) PCT Pub. No.: WO2004/049269

PCT Pub. Date: Jun. 10, 2004

(65) Prior Publication Data

US 2006/0238512 A1    Oct. 26, 2006

(30) Foreign Application Priority Data

Nov. 28, 2002 (FR) .................................. 02 15068

(51) Int. Cl.
G09G 5/00       (2006.01)
(52) U.S. Cl. ..................................... 345/173; 178/18.06
(58) Field of Classification Search .................. 341/15, 341/33; 340/635; 345/156, 168, 107, 30–68, 345/173; 361/280; 349/155; 178/18.06
See application file for complete search history.

(56) References Cited

U.S. PATENT DOCUMENTS

| 4,161,766 A | * | 7/1979 | Castleberry et al. ......... 361/280 |
| 4,224,615 A | | 9/1980 | Penz |
| 4,233,593 A | * | 11/1980 | Bigelow ..................... 341/15 |
| 4,379,287 A | * | 4/1983 | Tyler et al. ................ 341/33 |
| 4,380,040 A | * | 4/1983 | Posset ....................... 200/600 |
| 4,529,968 A | * | 7/1985 | Hilsum et al. ............... 340/635 |
| 5,572,205 A | * | 11/1996 | Caldwell et al. ............. 341/33 |
| 5,754,268 A | * | 5/1998 | Aihara et al. ............... 349/155 |
| 6,204,839 B1 | * | 3/2001 | Mato, Jr. .................... 345/168 |

(Continued)

FOREIGN PATENT DOCUMENTS

EP        0 306 403 A       3/1989

(Continued)

Primary Examiner—Quan-Zhen Wang
Assistant Examiner—Yuk Chow
(74) Attorney, Agent, or Firm—Lowe Hauptman Ham & Berner, LLP

(57) ABSTRACT

The invention pertains to a display device, the surface of the device being rendered touch-sensitive, the device comprising a first dedicated part comprising two insulating plates, a layer of material exhibiting electro-optical properties suitable for rendering all or part of its surface visible under the effect of an electrical control signal, the layer being disposed between the two plates, at least one first electrode having the shape of a pictogram, the first electrode being disposed on a face of one of the insulating plates, a second electrode disposed on a face of the other insulating plate opposite at least one first electrode. According to the invention, the second electrode is used as responsive element of the touch-sensitive surface of the device, the surface area of the second electrode is at least 9 mm$^2$, and the surface area of the second electrode is greater than the surface area or the sum of the surface areas of the first electrode or electrodes opposite.

15 Claims, 2 Drawing Sheets

U.S. PATENT DOCUMENTS

2004/0080486 A1* 4/2004 Troxell et al. .............. 345/156
2005/0231461 A1* 10/2005 Raap et al. .................. 345/107

FOREIGN PATENT DOCUMENTS

| | | |
|---|---|---|
| EP | 0 340 096 | 11/1989 |
| EP | 0 345 029 | 12/1989 |
| EP | 1 220 140 | 7/2002 |
| FR | 2 198 677 | 3/1974 |

* cited by examiner

DISPLAY DEVICE DEDICATED TO PROXIMITY DETECTION

CROSS-REFERENCE TO RELATED APPLICATIONS

The present Application is based on International Application No. PCT/EP2003/050903, filed on Nov. 27, 2003, which in turn corresponds to FR 02/15068 filed on Nov. 28, 2002, and priority is hereby claimed under 35 USC §119 based on these applications. Each of these applications are hereby incorporated by reference in their entirety into the present application.

BACKGROUND OF THE INVENTION

The invention pertains to a dedicated display device comprising means of detection of proximity. Such devices are used in particular for the construction of communication terminals of the type allowing an operator to transmit and to receive information within the framework of a friendly exchange with a processor. The invention finds a particular application in respect of the screens of interactive terminals comprising dedicated liquid crystal screens. The expression dedicated screen is understood to mean a screen comprising at least one or more pictograms locked-in during the design of the screen.

Such screens comprise two plates at least one of which is transparent. Between these plates are disposed liquid crystal molecules. To excite the liquid crystal molecules and to modify the polarity of a light ray which passes through them, the screen comprises transparent electrodes situated on internal faces of the two plates. In dedicated screens, in order to simplify the routing of connection pads of the electrodes, it is known to embody the electrodes of each plate in such a way that the whole set of pictograms is situated in an identical manner on the two electrodes opposite one another.

Dedicated screens are customarily rendered touch-sensitive by disposing one or more transparent touch layers on the device, these being based on contact or on capacitive or inductive effect or the like. The device can then serve to delimit pressing zones of this layer according to a desired composition. The pressing of the layer is usually done by a finger of an operator. The drawbacks associated with these known methods relate to the cost of the responsive component added to the screen and to the fact that the visual information provided by the device is inevitably altered by the add-on touch layers.

It is moreover known from patent FR 88 05665 to embody a display with incorporated touch-sensitive surface wherein one of the electrodes called the counter-electrode is used as responsive element, this counter-electrode possibly being split up into a plurality of zones each constituting a counter-electrode.

The application of the known principle to dedicated displays has a certain number of drawbacks in that it does not make it possible to simply adapt the size of the counter-electrodes to the various shapes and number of dedicated pictograms associated with a touch-sensitive zone. Thus the routing of the feed pads of each touch-sensitive counter-electrode may be rendered very tricky on account of the numerous feed pads of said associated pictograms opposite this same responsive counter-electrode.

Moreover, in a dedicated display, it is not possible to ignore the influence of the individual surface of each pictogram as regards the responsive counter-electrode since the designer of the pictogram is entirely at liberty to make it as small or as large as he so wishes for his application.

Thus, in the known art this would lead to the defining of a counter-electrode that is unsuited to the requirement of detection by capacitive effect on account of its overly small size and/or by parasitic images which are at risk of being engendered by the connection pads.

The invention aims to alleviate these problems by proposing a touch-sensitive dedicated screen with no added touch-sensitive layer.

SUMMARY OF THE INVENTION

For this purpose, the subject of the invention is a display device, the surface of the device being rendered touch-sensitive, the device comprising a first dedicated part comprising two insulating plates (1, 2), a layer (3) of material exhibiting electro-optical properties suitable for rendering all or part of its surface visible under the effect of an electrical control signal, the layer (3) being disposed between the two plates (1, 2), at least one first electrode (4, 5) having the shape of a pictogram, the first electrode (4, 5) being disposed on a face (6) of one (2) of the insulating plates, a second electrode (7) disposed on a face (8) of the other (1) insulating plate opposite at least one first electrode (4, 5), characterized in that the second electrode is used as responsive element of the touch-sensitive surface of the device, in that the surface area of the second electrode is at least 9 mm$^2$, and in that the surface area of the second electrode is greater than or equal to the surface area or the sum of the surface areas of the first electrode or electrodes opposite.

Dedicated display devices are embodied with the aid of static or weakly multiplexed liquid crystal screens. They make it possible to display pictograms predetermined during the design of the device. In the case of static or weakly multiplexed displays, it is known to link the counter-electrodes together in groups, directly on the plate supporting them, so as to simplify the routing and the number of outputs. It is obvious that this disposition does not make it possible to embody a touch-sensitive display in which one wishes to be able to access each responsive counter-electrode. Thus, according to the invention, provision is made to be able to access each sub-set of responsive counter-electrode individually.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The invention will be better understood and other advantages will become apparent on reading the detailed description of an embodiment given by way of example, description illustrated by the appended drawing in which.

DETAILED DESCRIPTION OF THE INVENTION

Figure 1:
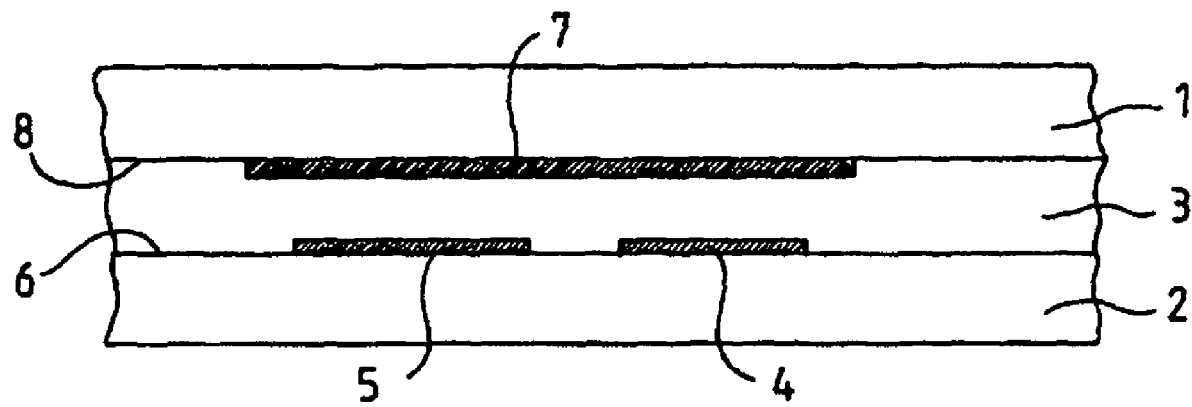
FIG. 1 represents in section a dedicated display device.

The display device represented in FIG. 1 comprises two insulating plates 1 and 2 disposed one above the other. At least one of the two plates 1 or 2 is transparent. The device also comprises a layer 3 made of a material exhibiting electro-optical properties able to transmit or otherwise a luminous radiation under the effect of an electrical excitation. This material comprises for example liquid crystal. The layer 3 is disposed between the two plates 1 and 2. The device comprises two first electrodes 4 and 5 having for example the form of a pictogram and being disposed on a face 6 of the plate 2. The device furthermore comprises a second electrode 7, disposed on a face 8 of the other insulating plate 1. The second electrode 7 is also called a counter-electrode. The second electrode 7 is disposed opposite the two first electrodes 4 and 5 so that a control signal applied between one of the first electrodes and the second electrode 7 modifies the state of the liquid crystal between the electrodes.

In FIG. 1 only three electrodes 4, 5 and 7 have been represented by way of example. It is of course understood that the invention may be implemented regardless of the number of electrodes.

Figure 2A:
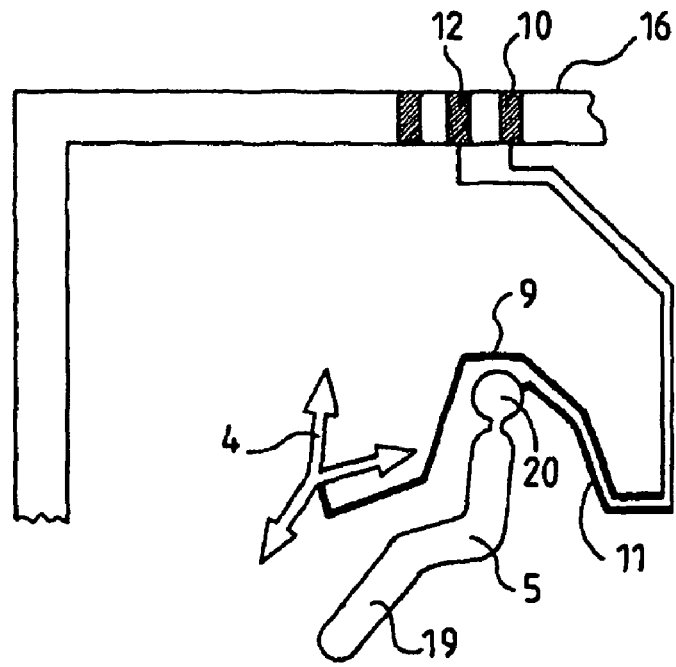
FIGS. 2a and 2b represent an exemplary embodiment of electrodes of a display device in accordance with the invention.

FIG. 2a represents an exemplary pictogram constructed with the aid of the electrodes 4 and 5. The pictogram of the electrode 4 represents three concurrent arrows and the pictogram of the electrode 5 represents a seated human silhouette. These two pictograms may represent for example the state of the ventilation in a motor vehicle. The electrode 4 is linked electrically by a pad 9 to a connection tag 10. The same holds for the electrode 5 which is linked by a pad 11 to a connection tag 12. The tags 10 and 12 make it possible to apply the control signal of the device to the electrodes 4 and 5. The tags 10 and 12 are situated on an edge 16 of the device.

The electrodes are generally made by etching. To make a display device with no touch-sensitive surface in a simple manner, the mask for etching the counter-electrode is made from a mirror image of the mask for etching the first electrodes 4 and 5, onto which mask is connected the mirror images of the first electrodes 4 and 5 by pads of small width. This way of making the counter-electrode is unsuited to the making of a display device whose surface is rendered touch-sensitive according to the invention.

Figure 2B:
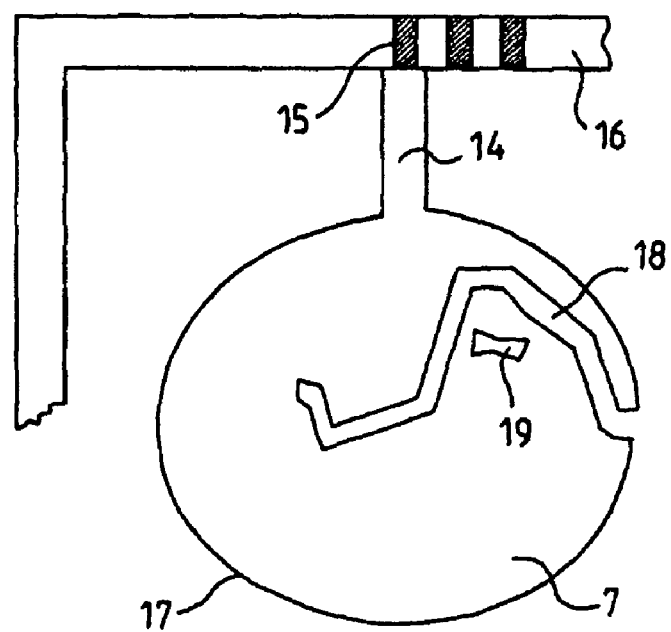

FIG. 2b represents the electrode 7 and its electrical connection pad 14. The pad 14 makes it possible to feed the electrode 7 via a tag 15 situated on the edge 16 of the device. In the exemplary embodiment represented, an exterior contour 17 of the electrode 7 is substantially oval. When the electrode 7 is placed opposite the electrodes 4 and 5, the latter are situated inside the contour 17. Stated otherwise, the electrode 7 completely covers the electrodes 4 and 5. Thus the area of the electrode 7 is greater than or equal to the sum of the areas of the electrodes 4 and 5. To ensure correct operation of the detection of proximity by capacitive effect, the electrode 7 must have an area of at least 9 mm$^2$. The capacitive effect is obtained by placing a finger of a user on the device opposite the electrode 7. A capacitance is then created between the electrode 7 and the finger. By injecting a high frequency electrical signal, for example 2 MHz, onto the electrode 7, it is possible to detect the presence of the finger by analyzing a possible weakening of the high frequency signal due to the existence of the capacitance created between the finger and the electrode 7. Trials have shown that if the area of the electrode 7 is less than 9 mm$^2$, the weakening of the high frequency signal is so small that it is practically impossible to detect.

Additionally, it is important to guarantee that the surface of the electrode 7 is influenced by the finger of an operator without the latter needing a precise positioning effort opposite a touch-sensitive zone. For this purpose, the pattern of the second electrode 7 substantially covers a circle of at least 9 mm in diameter. By making the counter-electrode 7 with a different pattern from those used for the first electrodes 4 and 5, this allows the designer of the device to make any shape of pictogram forming the pattern of the first electrodes 4 and 5 without worrying about any minimum surface area for ensuring the detection of proximity of a finger of the operator. By way of example, it is possible to associate a wire-like pictogram with a counter-electrode whose contour is substantially convex. The display is given by the shape of the pictogram and the detection of proximity is rendered possible by the substantially convex shape of the counter-electrode.

Advantageously, the electrode 7 is profiled opposite the pads 9 and 10. More precisely, the modification of state of the liquid crystal is obtained by applying a low frequency control signal, for example of 100 Hz, between on the one hand an electrode 7 and on the other hand at least one of the electrodes 4 or 5. The pads 9 and 11 are in part opposite the electrode 7 or more precisely inside the contour 17 of the electrode 7. If the electrode 7 occupies the whole of the area situated inside the contour 17, the parts of the pads 9 and 11 opposite the electrode 7 are then visible at the same time as the pictograms formed by the electrodes 4 and 5. To alleviate this defect and to allow only the pictograms to appear, the electrode 7 is profiled opposite the pads. A profiling 18 is clearly visible in FIG. 2b. The two FIGS. 2a and 2b are represented on the same scale and by overlaying them, the profiling 18 covers the part of the pads 9 and 11 that is situated inside the contour 17. This overlay prefigures the disposition of the electrodes 4, 5 and 7 in the device. In FIG. 2b, another profiling 19 made in the electrode 7 is also distinguished, making it possible, once the electrodes 4, 5 and 7 have been overlaid to visually separate the body 19 from the head 20 in the representation of the human silhouette constructed with the aid of the electrode 5.

Advantageously, the device comprises several counter-electrodes 7. To ensure the detection of presence of a conducting element in proximity to each counter-electrode 7, each is fed separately. More precisely, each possesses its own pad 14 each ending at a distinct tag 15.

Advantageously, the device comprises two parts. A first part is dedicated as described hereinabove and a second part is non-dedicated. This second part is advantageously arranged in the form of a matrix with row-wise and column-wise addressing. This arrangement in two parts is described in European patent EP 0 306 403.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A display device, a surface of the device being rendered touch-sensitive, the device comprising:
   a first dedicated part having two insulating plates;
   a layer of material exhibiting electro-optical properties suitable for rendering all or part of a surface of the layer of material visible under the effect of an electrical control signal, the layer being disposed between inner faces of the two insulating plates;

at least one first electrode having a shape of a pictogram, the at least one first electrode being disposed on the inner face of one of the insulating plates;

a touch sensor comprising a second electrode disposed on the inner face of the other insulating plate opposite the at least one first electrode, wherein the electrical control signal is applied between the at least one first electrode and the second electrode, and a touch sensor signal distinct from the electrical control signal is also applied to the second electrode, the touch sensor signal is configured to enable proximity detection of a finger by capacitive effect;

a surface area of the second electrode is at least 9 mm$^2$, and the surface area of the second electrode is greater than or equal to the surface area or the sum of the surface areas of the at least one first electrode.

2. The device as claimed in claim 1, wherein the at least one first electrode is fed electrically by a pad in that the second electrode is profiled opposite the pad.

3. The device as claimed in claim 2, further comprising several second electrodes, and in that each second electrode is fed separately.

4. The device as claimed in claim 2, wherein a pattern of the second electrode covers substantially a circle of at least 9 mm in diameter.

5. The device as claimed in claim 2, further comprising a second non-dedicated part.

6. The device as claimed in claim 1, wherein the device comprises several second electrodes, and in that each second electrode is fed separately.

7. The device as claimed in claim 6, wherein a pattern of the second electrode covers substantially a circle of at least 9 mm in diameter.

8. The device as claimed in claim 6, further comprising a second non-dedicated part.

9. The device as claimed in claim 1, wherein a pattern of the second electrode covers substantially a circle of at least 9 mm in diameter.

10. The device as claimed in claim 9, further comprising a second non-dedicated part.

11. The device as claimed in claim 1, further comprising a second non-dedicated part.

12. The device as claimed in claim 11, wherein the second non-dedicated part is arranged in the form of a matrix with row-wise and column-wise addressing.

13. The device as claimed in claim 1, wherein the electrical control signal is a low frequency signal and the touch sensor signal is a high frequency signal.

14. The device as claimed in claim 1, wherein the electrical control signal is a low frequency signal of about 100 Hz and the touch sensor signal is a high frequency signal of about 2 MHz.

15. The device as claimed in claim 1, wherein application of a high frequency touch sensor signal, onto the second electrode, enables detection of the finger by analyzing a change in the high frequency touch sensor signal in the second electrode due to an existence of a capacitance created between the finger and the second electrode.

\* \* \* \* \*